US008625316B2

(12) United States Patent  (10) Patent No.: US 8,625,316 B2
Grbovic et al.  (45) Date of Patent: Jan. 7, 2014

(54) NEUTRAL POINT CLAMPED (NPC) POWER CONVERTER FAULT PROTECTION SYSTEM

(75) Inventors: Petar Jovan Grbovic, Ismaning (DE); Mathieu Giroux, Munich (DE)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 13/315,377

(22) Filed: Dec. 9, 2011

(65) Prior Publication Data

US 2013/0148391 A1  Jun. 13, 2013

(51) Int. Cl.
*H02H 7/122* (2006.01)
(52) U.S. Cl.
USPC ............................. 363/56.1; 361/57; 361/102
(58) Field of Classification Search
USPC .......... 361/18, 54, 57, 102, 115; 363/55, 56.1
See application file for complete search history.

(56) References Cited

U.S. PATENT DOCUMENTS

| | | | | |
|---|---|---|---|---|
| 5,274,542 A | * | 12/1993 | Tanaka et al. | 363/96 |
| 5,910,892 A | * | 6/1999 | Lyons et al. | 363/98 |
| 6,031,738 A | * | 2/2000 | Lipo et al. | 363/37 |
| 6,633,092 B2 | * | 10/2003 | Dahler et al. | 307/100 |

* cited by examiner

*Primary Examiner* — Gary L Laxton
*Assistant Examiner* — Kyle J Moody
(74) *Attorney, Agent, or Firm* — Cantor Colburn LLP

(57) ABSTRACT

A neutral point clamped (NPC) power converter fault protection system is provided, and include a DC bus, a switching network, and a control module. The switching network is connected to the DC bus. The switching network includes at least two leg circuits. Each of the at least two leg circuits includes at least two switches connected in series and two NPC diodes. Each of the two NPC diodes corresponds to one of the at least two switches. Each of the at least two switches has an open position. The two NPC diodes are connected between a corresponding one of the at least two leg circuits and the DC bus. The control module is in communication with the switching network. The control module includes control logic for monitoring the switching network to detect a fault condition.

20 Claims, 4 Drawing Sheets

U.S. 8,625,316 B2

1

NEUTRAL POINT CLAMPED (NPC) POWER CONVERTER FAULT PROTECTION SYSTEM

BACKGROUND OF THE INVENTION

The subject matter disclosed herein relates to a neutral point clamped (NPC) power converter, and more specifically to a fault protection system for a NPC power converter.

Power converters are employed in many different power conversion applications such as, for example, variable speed drives, wind and solar converters, power supplies, uninterruptable power supplies (UPS), and static synchronous compensators (STATCOM). The power converter is connected to a power grid through a line inductor, a circuit breaker, and a step-up transformer. In one type of power converter, a three-level neutral point clamped (NPC) topology is used. An NPC converter typically includes three phase legs and two series connected DC bus capacitors. Each phase leg includes four series connected switches, where each switch has a parallel freewheeling diode. Two additional diodes, which are referred to as NPC diodes, are connected between the leg and a DC bus mid-point.

In the event one of the NPC diodes is inoperable, a short circuit condition may be created. The charging current, which is also referred to as the fault current, flows through one of the DC bus capacitors as well as through a number of the freewheeling diodes. The charging current will charge the capacitor and increase the voltage to a level that is significantly above the nominal conditions of the parallel freewheeling diodes and the DC bus capacitor. For example, the DC bus capacitor may have a nominal voltage of 1150 Volts, however the charging current may reach levels as high as about 1900 Volts. This may cause the power converter to become non-operational.

In one approach, a crowbar circuit may be employed to protect the power converter in the event one of the NPC diodes is inoperable. The crowbar generally prevents current from flowing to a DC bus of the converter in the event a fault is detected. However, a crowbar circuit adds cost and complexity to the existing power converter as well.

BRIEF DESCRIPTION OF THE INVENTION

According to one aspect of the invention, a neutral point clamped (NPC) power converter fault protection system is provided, and include a DC bus, a switching network, and a control module. The switching network is connected to the DC bus. The switching network includes at least two leg circuits. Each of the at least two leg circuits includes at least two switches connected in series and two NPC diodes. Each of the two NPC diodes corresponds to one of the at least two switches. Each of the at least two switches has an open position. The two NPC diodes are connected between a corresponding one of the at least two leg circuits and the DC bus. The control module is in communication with the switching network. The control module includes control logic for monitoring the switching network to detect a fault condition. The fault condition indicates that one of the two NPC diodes of the one of the at least two leg circuits is non-operational. The control module includes control logic for switching the at least two switches of each of the at least two circuit legs to the open position. The control module includes control logic for determining a position of a non-operational NPC diode if the fault condition is detected. The control module includes control logic maintaining one of the at least two switches that correspond to the non-operational NPC diode in the open position.

According to another aspect of the invention, a method of controlling a neutral point clamped (NPC) power converter fault protection system is provided. The method includes providing a switching network connected to the DC bus. The switching network includes at least two leg circuits. Each of the at least two leg circuits includes at least two switches connected in series and two NPC diodes. Each of the two NPC diodes corresponds to one of the at least two switches. The method includes monitoring the switching network to detect a fault condition. The fault condition indicates that one of the two NPC diodes of the one of the at least two leg circuits is non-operational. The method includes switching the at least two switches of each of the at least two circuit legs to an open position. The method includes determining a position of a non-operational NPC diode if the fault condition is detected. The method includes maintaining one of the at least two switches that correspond to the non-operational NPC diode in the open position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As used herein, the term "control module" refers to an application specific integrated circuit (ASIC), an electronic circuit, a processor (shared, dedicated, or group) and memory that executes one or more software or firmware programs, a combinational logic circuit, and/or other suitable components that provide the described functionality. As used herein, the term "freewheeling diode" refers to a diode that is connected in parallel with a switch to provide a free path for an inductor current As used herein, the term "NPC converter" refers to a neutral point clamped power converter including at least two phase leg circuits and at least two series connected DC bus capacitors. Each leg circuit includes a plurality of series connected switches, where each switch has a corresponding parallel freewheeling diode. Two additional diodes, which are herein referred to as "NPC diodes", are connected between each of the phase legs and a DC bus mid-point.

Figure 1:
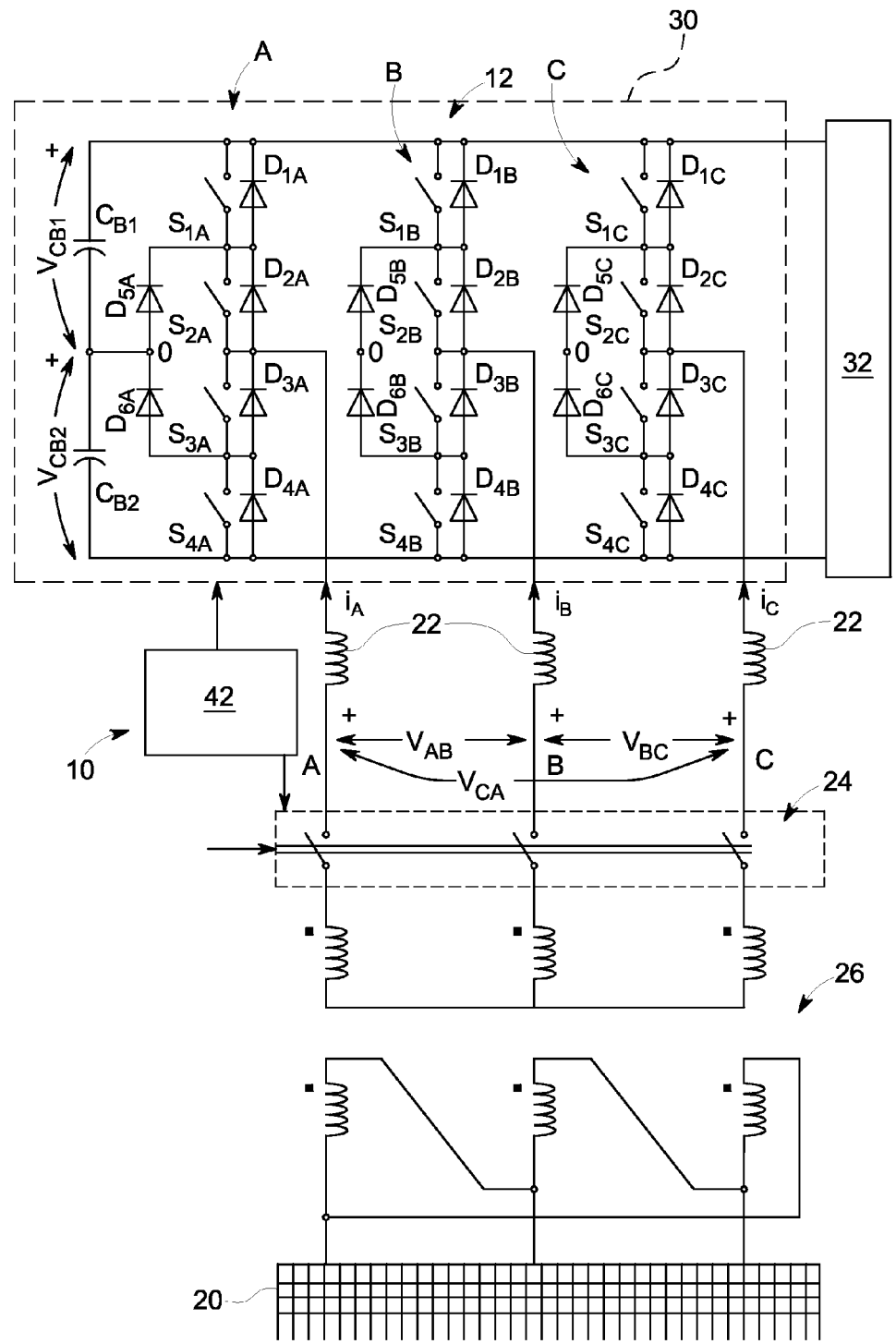
FIG. 1 is a schematic view of an exemplary neutral point clamped (NPC) power converter fault protection system.

FIG. 1 is a perspective view of a portion of an exemplary NPC power converter fault protection system 10 including a NPC power converter 12 for supplying AC power to a power grid 20. The NPC power converter 12 may be employed in a variety of power conversion applications such as, for example, variable speed drives, wind and solar converters, power supplies, uninterruptable power supplies (UPS), and static synchronous compensators (STATCOM). The NPC power converter 12 is connected to the power grid 20 through line inductors 22, a circuit breaker 24, and a step-up transformer 26. The circuit breaker 24 selectively connects the NPC power converter 12 to the power grid 20. The NPC power converter 12 includes a switching network 30 that is connected to the circuit breaker 24 and a DC bus 32.

The switching network 30 may include at least two leg circuits, however in the exemplary embodiment as shown, the switching network 30 includes three leg circuits labeled as 'A', 'B' and 'C'. Each of the three leg circuits A, B and C include at least two switches connected together in series, however in the embodiment as illustrated each of the three leg circuits A, B and C include four switches that are connected in series and labeled $S_{1A}$-$S_{4C}$. Specifically, each of the switches $S_{1A}$-$S_{C4}$ in the leg circuit A are labeled as $S_{1A}$, $S_{2A}$, $S_{3A}$, and $S_{4A}$, the switches in leg circuit B as labeled as $S_{1B}$, $S_{2B}$, $S_{3B}$, and $S_{4B}$, and the switches in leg circuit C as labeled as $S_{1C}$, $S_{2C}$, $S_{3C}$, and $S_{4C}$. In the embodiment as illustrated, the switches $S_{1A}$-$S_{4C}$ are single-pole single throw switches, however it is to be understood that other switching elements may be used as well, such as for example, transistors.

Each of the switching elements $S_{1A}$-$S_{4C}$ includes a corresponding freewheeling diode that is connected in parallel with the switching element. Specifically, in the exemplary embodiment as illustrated, the freewheeling diodes $D_{1A}$-$D_{4C}$ correspond to the switches $S_{1A}$-$S_{4C}$. For example, the freewheeling diode labeled $D_{1A}$ corresponds to switch $S_{1A}$. Each of the leg circuits A, B and C also include two NPC diodes which are connected to a corresponding one of the leg circuits A, B, and C and the DC bus 32. Specifically, leg circuit A includes NPC diodes $D_{5A}$ and $D_{6A}$, leg circuit B includes NPC diodes $D_{5B}$ and $D_{6B}$, and leg circuit C includes NPC diodes $D_{5C}$ and $D_{6C}$. The NPC power converter 12 further includes two series connected capacitors $C_{B1}$ and $C_{B2}$ that are connected between a neutral point 40 and the DC bus 32. In the exemplary embodiment as shown in FIG. 1, the NPC power converter 12 is a three-level NPC type power converter having a total of twelve switches, eighteen diodes, and two capacitors.

A control module 42 is in communication with the NPC power converter 12 and the circuit breaker 24. The control module 42 includes control logic for providing pulse width modulation (PWM) control to the NPC power converter 12. In one example, space vector modulation may be used to control the switches $S_{1A}$-$S_{4C}$ of the switching network 30. The control module 42 also includes control logic for selectively connecting and disconnecting the circuit breaker 24 from the power grid 20. The control module 42 includes control logic for monitoring the switching network 30 to detect a fault condition with one of the NPC diodes $D_{5A}$-$D_{6C}$. That is, the control module 42 includes control logic for determining a fault in any of the NPC diodes $D_{5A}$-$D_{6C}$ located in any of the three leg circuits A, B, or C. For example, in one embodiment, a fault condition may be determined if only one of the NPC diodes $D_{5A}$-$D_{6C}$ is desaturated, and a desaturation signal is received by the control module 42. The fault condition indicates that one of the NPC diodes $D_{5A}$-$D_{6C}$ are non-operational and act as a short circuit in the switching network 30.

In the event a fault condition is detected, the control module 42 includes control logic for switching each of the switches $S_{1A}$-$S_{4C}$ to an open position, where current is interrupted. The control module 42 also includes control logic for sending a disconnection signal to the circuit breaker 24 to disconnect the circuit breaker 24 from the power grid 20.

Figure 2:
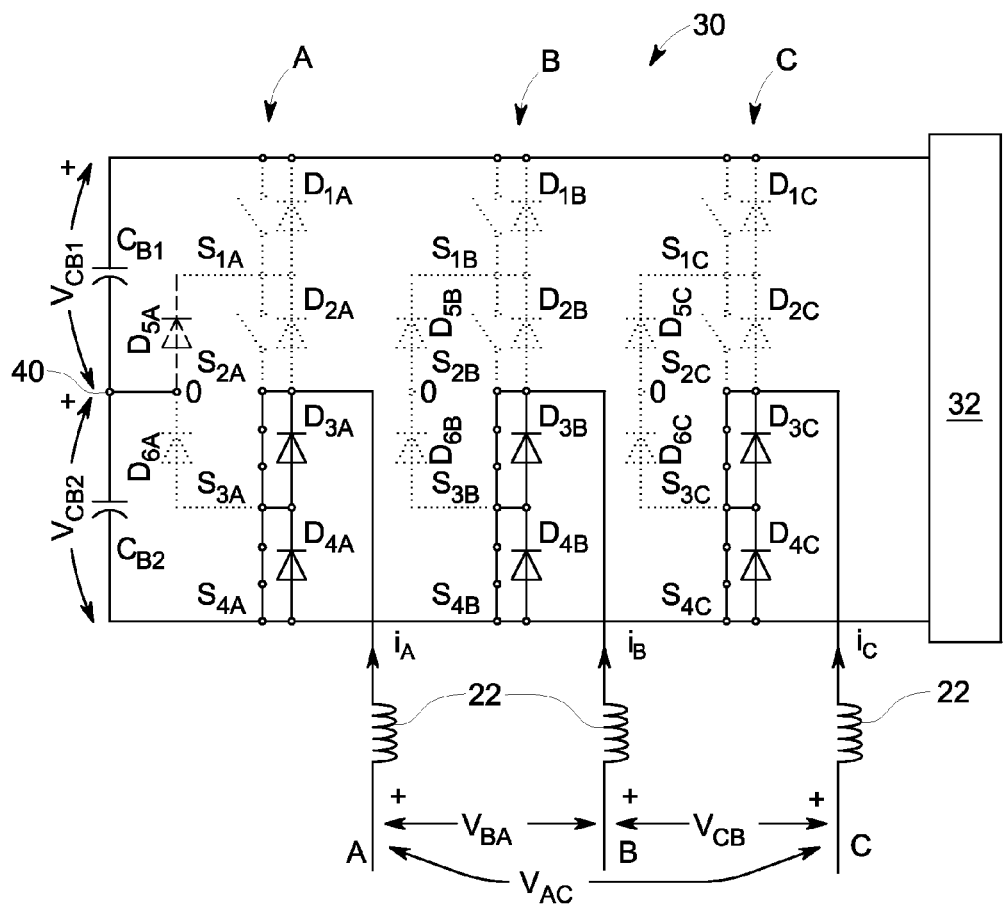
FIG. 2 is a schematic view illustrating one embodiment of a switching scheme at a zero vector state.

The control module 42 also includes control logic for determining a position of the non-operational NPC diode if the fault condition exists. For example, referring to FIG. 2, NPC diode $D_{5A}$ is non-operational, and acts as a short circuit. The control module 42 (shown in FIG. 1) includes control logic for determining that it is NPC diode $D_{5A}$, which is located in leg circuit A, that is non-operational. Specifically, in the example as described, the switch $S_{1A}$ would send a desaturation signal to the control module 42, which indicates the short circuit condition in NPC diode $D_{5A}$. The control module 42 then sends a holding signal to the switch that corresponds to the non-operational diode. The holding signal maintains the switch corresponding to the non-operational diode in the open position. For example, in the embodiment as shown in FIG. 2, because NPC diode $D_{5A}$ is non-operational, the switch $S_{1A}$ would be held in the open position. In the event NPC diode $D_{6A}$ is non-operational, then the switch $S_{4A}$ would be held or maintained in the open position. It should be noted that while NPC diode $D_{5A}$ is shown as the non-operational NPC diode, it is understood that NPC diodes $D_{5B}$-$D_{6C}$ may also be the non-operational NPC diode as well.

The control module 42 includes control logic for selecting a modulation or switching scheme based on the position of the non-operational NPC diode. A variety of different switching schemes are available. FIG. 2 is one embodiment of a switching scheme that is used if the fault condition exists. In the embodiment as shown in FIG. 2, NPC diode $D_{5A}$ is non-operational. The switching scheme as illustrated in FIG. 2 diverts a line current $i_A$ from the neutral point 40.

Figure 3:
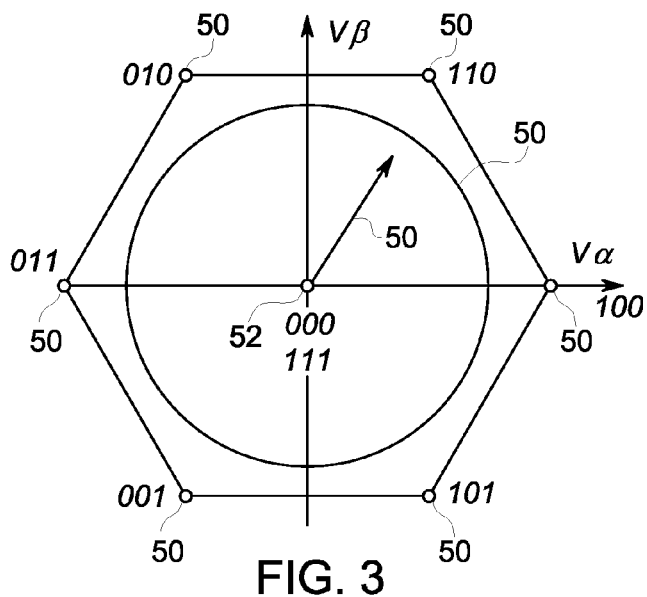
FIG. 3 is a space vector illustration of the switching scheme shown in FIG. 2.

In the exemplary embodiment as shown, two of the switches in each of the leg circuits A, B and C that are positioned closest to the line inductors 22 are switched to the closed position to allow the flow of current. Specifically, in the embodiment as illustrated, switches $S_{3A}$, $S_{4A}$, $S_{3B}$, $S_{4B}$, $S_{3C}$ and $S_{4C}$ are all in the closed position. The remaining switches (which are illustrated in phantom line) are in the open position. The line current flowing through the switches $S_{3A}$, $S_{4A}$, $S_{3B}$, $S_{4B}$, $S_{3C}$ and $S_{4C}$ is about the same as the fault current. The fault current is determined by the inductance of the line inductors 22 (which may include a transformer leakage inductance), as well as the voltage of the corresponding capacitor $C_{B1}$, which is voltage $V_{CB1}$. If NPC diode $D_{5A}$ was the non-operational diode, then the voltage $V_{CB1}$ of capacitor $C_{B1}$ would be used instead. In one embodiment, the fault current may range from about five to about ten times the nominal current, however the switching scheme as shown in FIG. 2 substantially presents the capacitors $C_{B1}$ and $C_{B2}$ from reaching a voltage value that may create damage or cause the capacitors $C_{B1}$ and $C_{B2}$ to become non-operational. FIG. 3 is a space vector diagram illustrating the grid voltage 50 and the power converter voltage 52 when the switching scheme shown in FIG. 2 is employed. As shown in FIG. 3, the power converter voltage is about zero volts. Once the switching scheme has been executed, the control module 42 includes control logic for disconnecting the circuit breaker 24, and the NPC power converter 12 is now in safe mode.

Figure 4:
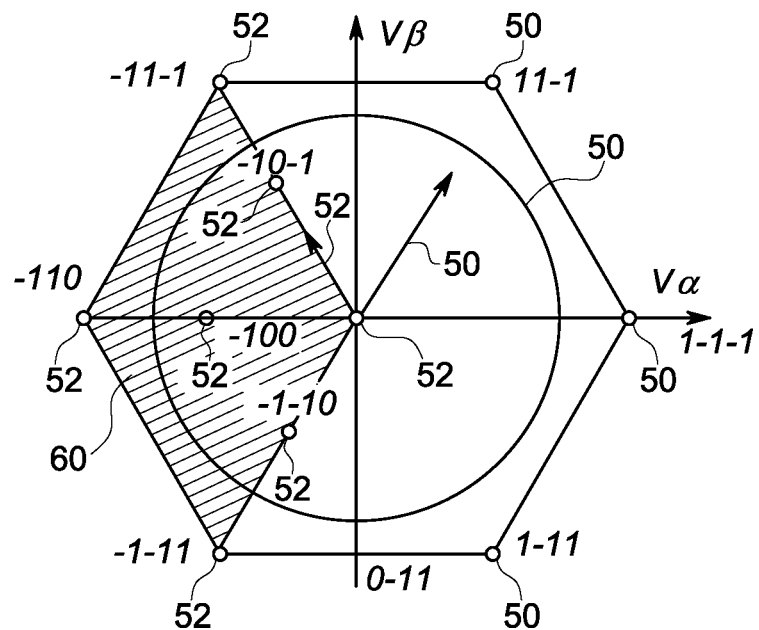
FIG. 4 is a space vector illustration of another embodiment of a switching scheme.

In another switching scheme, assuming NPC diode $D_{5A}$ is non-operational, the switching scheme has switch $S_{1A}$ in the open position and switches $S_{3A}$ and $S_{4A}$ in the closed position. The remaining switches $S_{1B}$-$S_{4C}$ in leg circuits B and C may be switched using an approach as illustrated in FIG. 4, which is another space vector diagram. That is, with reference to FIG. 1, leg circuit A, which is positioned closest to the two capacitors $C_{B1}$ and $C_{B2}$ and closest to the corresponding line inductor 22 of leg circuit A, has switches $S_{3A}$ and $S_{4A}$. Turning back to FIG. 4, the shaded area indicated by reference number 60 indicates the possible voltage vectors that may be produced by the NPC power converter 12 as shown in FIG. 1. The difference between the grid voltage 50 and the power converter voltage 52 defines the fault current. The following Table 1 explains which switches are in the open position and the closed position to achieve the space vector diagram as shown in FIG. 4.

TABLE 1

Voltage Vector Table

| Switching Symbols | S1X | S2X | S3X | S4X | Converter Terminal Voltage |
|---|---|---|---|---|---|
| 1 | ON | ON | OFF | OFF | $V_{CB1}$ |
| 0 | OFF | ON | ON | OFF | 0 |
| −1 | OFF | OFF | ON | ON | $-V_{CB2}$ |

The term "ON" means that a switch is closed or conducting, and the term "OFF" means that a switch is open or not conducting. For example, with reference to Table 1 and FIGS. 2 and 4, in the event the switching state "−1 1 −1" is selected (shown in FIG. 4), this means that in leg circuit A, switches $S_{3A}$ and $S_{4A}$ are ON or closed, in leg circuit B switches $S_{1B}$ and $S_{2B}$ are ON or closed, and in leg circuit C switches $S_{3C}$ and $S_{4C}$ are ON or closed.

Figure 5:
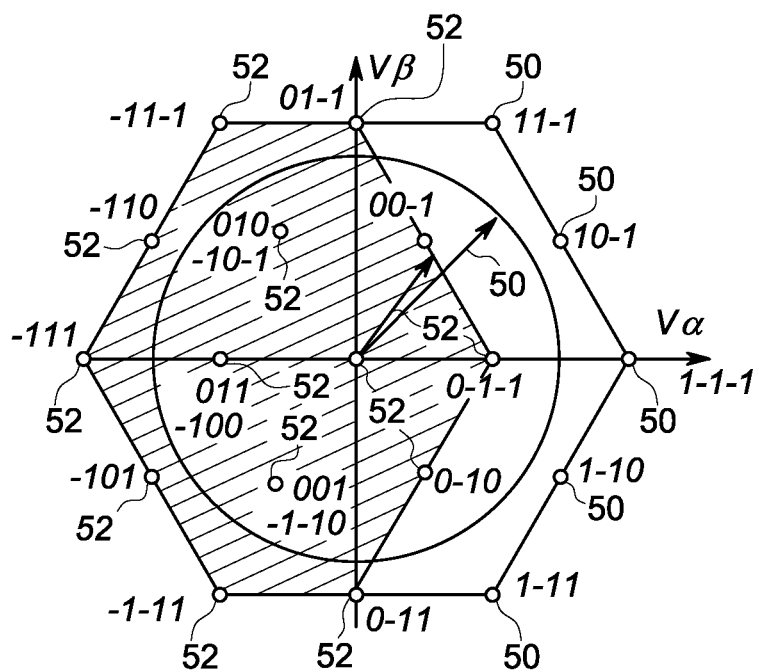
FIG. 5 is a space vector illustration of yet another embodiment of a switching scheme.

FIG. 5 is yet another embodiment of a switching scheme illustrated as a space vector diagram. In this approach, the switch $S_{1A}$ must not be in the ON or closed position. However, the other three switches in the leg circuit A, $S_{2A}$, $S_{3A}$ and $S_{4A}$, may be in either the open or the closed position. The switches in the other leg circuits B and C may also be in either the open or closed position.

Figure 6:
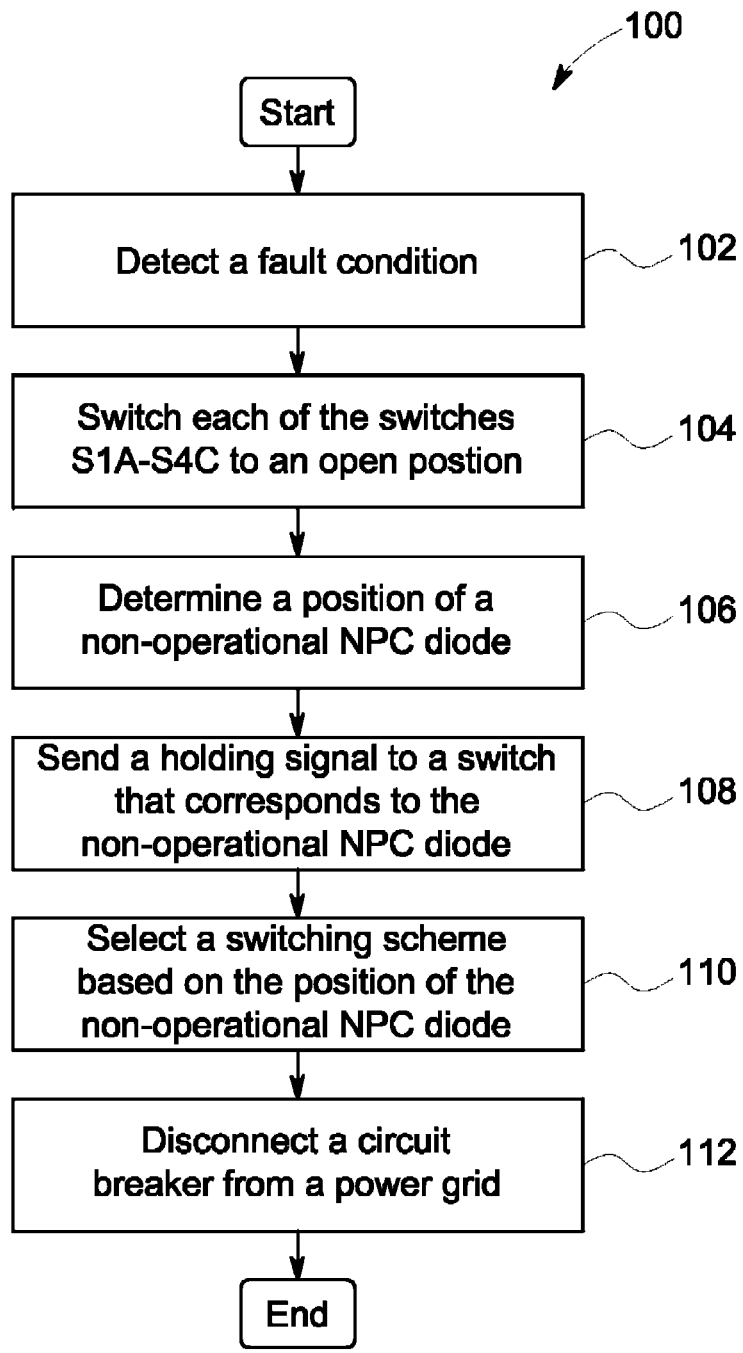
FIG. 6 is an exemplary process flow diagram illustrating a method of operating the NPC power converter fault protection system as shown in FIG. 1.

FIG. 6 is a process flow diagram of an exemplary method of operating the NPC power converter fault protection system 10 (shown in FIGS. 1-2). An exemplary process of operating the NPC power converter fault protection system 10 is generally indicated by reference number 100. Process 100 begins at 102, where the control module 42 includes control logic for detecting a fault condition. Referring to FIGS. 1-2 and 6, the fault condition indicates that one of the two NPC diodes of one of the three leg circuits A, B, or C, is non-operational. Process 100 may then proceed to 104. In 104, the control module 42 includes control logic for switching each of the switches $S_{1A}$-$S_{4C}$ (shown in FIG. 1) to the open position. Process 100 may then proceed to 106. In 106, the control module 42 includes control logic for determining a position of a non-operational NPC diode if the fault condition is detected. Process 100 may then proceed to 108. In 108, the control module 42 includes control logic for sending a holding signal to the switch that corresponds to the non-operational NPC diode. The holding signal maintains the switch that corresponds to the non-operational NPC diode in the open position. Process 100 may then proceed to step 110. In step 110, the control module 42 includes control logic for selecting a modulation or switching scheme based on the position of the non-operational NPC diode. A variety of different switching schemes are illustrated in FIGS. 2-5. Process 100 may then proceed to step 112. In step 112, the control module 42 includes control logic for disconnecting the circuit breaker 24 from the power grid 20. Process 100 may then terminate.

The above described system and method of operating the NPC power converter fault protection system 10 provides reduced voltage to capacitors $C_{B1}$ and $C_{B2}$ (in the embodiment as shown in FIGS. 2-3) or a reduced fault current (in the embodiment as shown in FIG. 4-5). The NPC power converter fault protection system 10 provides reduced cost when compared to some of the power converter protection systems that are currently available, such as a crowbar circuit. Also, the total cost of the NPC power converter 12 may be reduced because the switches and line inductors 22 may have a reduced current rating as well.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A neutral point clamped (NPC) power converter fault protection system, comprising:
    a DC bus;
    a switching network connected to the DC bus, the switching network including at least two leg circuits, each of the at least two leg circuits including:
        at least two switches connected in series and two NPC diodes, each of the two NPC diodes corresponding to one of the at least two switches, each of the at least two switches having an open position, the two NPC diodes connected between a corresponding one of the at least two leg circuits and the DC bus; and
    a control module in communication with the switching network, the control module including:
        a first control logic for monitoring the switching network to detect a fault condition, the fault condition indicating that one of the two NPC diodes of the one of the at least two leg circuits is non-operational;
        a second control logic for switching the at least two switches of each of the at least two leg circuits to the open position;
        a third control logic for determining a position of a non-operational NPC diode if the fault condition is detected; and
        a fourth control logic for maintaining one of the at least two switches in the open position.

2. The NPC power converter fault protection system as recited in claim 1, wherein each of the at least two switches includes a freewheeling diode.

3. The NPC power converter fault protection system as recited in claim 1, comprising a circuit breaker selectively connected to a power grid, the circuit breaker in communication with the control module, wherein the control module includes a fifth control logic for disconnecting the circuit breaker from the power grid if the fault condition exists.

4. The NPC power converter fault protection system as recited in claim 3, comprising a corresponding line inductor positioned between each of the at least two leg circuits and the circuit breaker.

5. The NPC power converter fault protection system as recited in claim 4, wherein each of the at least two leg circuits include four switches, and wherein the second control logic switches two of the four switches of each of the at least two leg circuits that are positioned closest to the corresponding line inductor to a closed position.

6. The NPC power converter fault protection system as recited in claim 4, wherein the switching network includes three leg circuits and two capacitors, wherein the two capacitors are each connected to a neutral point of the switching network.

7. The NPC power converter fault protection system as recited in claim 6, wherein each of the three leg circuits include four switches, and wherein the second control logic switches two of the four switches of a leg circuit positioned closest to the two capacitors and closest to the corresponding line inductor to a closed position.

8. The NPC power converter fault protection system as recited in claim 6, wherein each of the three leg circuits include four switches, and wherein the control module includes a sixth control logic for switching a remaining portion of the four switches of each of the three leg circuits that are not maintained in the open position using space vector modulation.

9. The NPC power converter fault protection system as recited in claim 1, wherein the control module includes a seventh control logic for providing pulse width modulation (PWM) control to the switching network, and wherein space vector modulation is used to control the at least two switches.

10. A neutral point clamped (NPC) power converter connected to a circuit breaker and a DC bus, the circuit breaker selectively connected to a power grid, comprising:
  a switching network connected to the DC bus, the switching network including at least two leg circuits, each of the at least two leg circuits including:
    at least two switches connected in series and two NPC diodes, each of the two NPC diodes corresponding to one of the at least two switches, each of the at least two switches having an open position, the two NPC diodes connected between a corresponding one of the at least two leg circuits and the DC bus, and each of the at least two switches including a freewheeling diode; and
  a control module in communication with the switching network of the power converter and the circuit breaker, the control module including:
    a first control logic for monitoring the switching network to detect a fault condition, the fault condition indicating that one of the two NPC diodes of the one of the at least two leg circuits is non-operational;
    a second control logic for switching the at least two switches of each of the at least two leg circuits to the open position;
    a third control logic for determining a position of a non-operational NPC diode if the fault condition is detected;
    a fourth control logic for maintaining one of the at least two switches in the open position; and
    a fifth control logic for disconnecting the circuit breaker from the power grid if the fault condition exists.

11. The NPC power converter as recited in claim 10, comprising a corresponding line inductor positioned between each of the at least two leg circuits and the circuit breaker.

12. The NPC power converter as recited in claim 11, wherein each of the at least two leg circuits include four switches, and wherein the second control logic switches two of the four switches of each of the at least two leg circuits that are positioned closest to the corresponding line inductor to a closed position.

13. NPC power converter as recited in claim 11, wherein the switching network includes three leg circuits and two capacitors that are each connected to a neutral point of the switching network.

14. The NPC power converter as recited in claim 13, wherein each of the three leg circuits include four switches, and wherein the second control logic switches two of the four switches of a leg circuit positioned closest to the two capacitors and closest to the corresponding line inductor to a closed position.

15. The NPC power converter as recited in claim 13, wherein each of the three leg circuits include four switches, and wherein the control module includes sixth control logic for switching a remaining portion of the four switches of each of the three leg circuits that are not maintained in the open position using space vector modulation.

16. The NPC power converter as recited in claim 10, wherein the control module includes a seventh control logic for providing pulse width modulation (PWM) control to the switching network, and wherein space vector modulation is used to control the at least two switches.

17. A method of controlling a neutral point clamped (NPC) power converter fault protection system, the method comprising:
  providing a switching network connected to a DC bus, the switching network including at least two leg circuits, each of the at least two leg circuits including at least two switches connected in series and two NPC diodes, each of the two NPC diodes corresponding to one of the at least two switches;
  monitoring the switching network to detect a fault condition, the fault condition indicating that one of the two NPC diodes of the one of the at least two leg circuits is non-operational;
  switching the at least two switches of each of the at least two leg circuits to an open position;
  determining a position of a non-operational NPC diode if the fault condition is detected; and
  maintaining one of the at least two switches in the open position.

18. The method as recited in claim 17, comprising providing each of the at least two switches with a freewheeling diode.

19. The method as recited in claim 18, comprising disconnecting a circuit breaker from a power grid if the fault condition exists.

20. The method as recited in claim 19, comprising providing a corresponding line inductor positioned between each of the at least two leg circuits and the circuit breaker.

* * * * *